US 9,695,752 B2
Jul. 4, 2017

(12) United States Patent
Chapman

(54) ENGINE-INDUCED AIRCRAFT CABIN RESONANCE REDUCTION SYSTEM AND METHOD

(71) Applicant: HONEYWELL INTERNATIONAL INC., Morristown, NJ (US)

(72) Inventor: Gregory J Chapman, Scottsdale, AZ (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 0 days.

(21) Appl. No.: 14/478,625

(22) Filed: Sep. 5, 2014

(65) Prior Publication Data

US 2016/0069274 A1    Mar. 10, 2016

(51) Int. Cl.
| | | |
|---|---|---|
| *G06F 19/00* | (2011.01) | |
| *G06G 7/70* | (2006.01) | |
| *F02C 9/22* | (2006.01) | |
| *B64D 31/12* | (2006.01) | |
| *F01D 17/10* | (2006.01) | |
| *F02C 9/20* | (2006.01) | |
| *F02C 9/28* | (2006.01) | |
| *B64D 31/06* | (2006.01) | |
| *B64D 43/02* | (2006.01) | |
| *F02C 6/20* | (2006.01) | |

(52) U.S. Cl.
CPC ............... *F02C 9/22* (2013.01); *B64D 31/06* (2013.01); *B64D 31/12* (2013.01); *B64D 43/02* (2013.01); *F01D 17/10* (2013.01); *F02C 6/20* (2013.01); *F02C 9/20* (2013.01); *F02C 9/28* (2013.01); *F05D 2220/323* (2013.01); *F05D 2260/96* (2013.01)

(58) Field of Classification Search
CPC .................................. F02C 9/42; B64D 31/12
USPC ......................................................... 701/100
See application file for complete search history.

(56) References Cited

U.S. PATENT DOCUMENTS

| | | | |
|---|---|---|---|
| 2,557,991 A | 6/1951 | Nichols | |
| 3,186,165 A | 6/1965 | Edkins | |
| 5,058,376 A | 10/1991 | Snow | |
| 5,224,340 A | 7/1993 | Snow | |

(Continued)

OTHER PUBLICATIONS

EP Extended Search Report for Application No. 15182244.2 Dated Feb. 2, 2016.

(Continued)

*Primary Examiner* — Imran Mustafa
(74) *Attorney, Agent, or Firm* — Lorenz & Kopf, LLP

(57) ABSTRACT

A system method of reducing engine induced aircraft cabin resonance in an aircraft includes sensing a parameter representative of current aircraft flight conditions, and sensing a parameter representative of current engine operating conditions of at least one of a first turbofan gas turbine engines or a second turbofan gas turbine engine. In a control system, the parameter representative of current aircraft flight conditions and the parameter representative of current engine operating conditions are processed to supply a variable inlet guide vane (VIGV) offset value. The VIGV offset value is applied to a VIGV reference command associated with one of the first or second turbofan gas turbine engine, to thereby cause the VIGVs of one of the first or second turbofan gas turbine engine to move to a more closed position.

11 Claims, 3 Drawing Sheets

(56) References Cited

U.S. PATENT DOCUMENTS

| | | | |
|---|---|---|---|
| 8,489,306 B2 | 7/2013 | Sahm et al. | |
| 2003/0066294 A1* | 4/2003 | Mannarino | F04D 27/0246 60/773 |
| 2006/0101826 A1 | 5/2006 | Martis et al. | |
| 2008/0270003 A1* | 10/2008 | Sims | F02C 9/28 701/100 |
| 2011/0288740 A1* | 11/2011 | Sahm | F02C 9/42 701/100 |

OTHER PUBLICATIONS

EP Examination Report for Application No. 15182244.2-1607 dated Dec. 13, 2016.

\* cited by examiner

ENGINE-INDUCED AIRCRAFT CABIN RESONANCE REDUCTION SYSTEM AND METHOD

TECHNICAL FIELD

The present invention generally relates to aircraft cabin resonance, and more particularly relates to a system and method for reducing engine-induced aircraft cabin resonance.

BACKGROUND

One some multi-engine aircraft, engine-induced acoustic resonance can be generated, resulting in noise and sometimes vibration being transmitted into the aircraft cabin. The resulting noise and vibration can lead to passenger discomfort. Known approaches to controlling noise and vibration include matching the rotational speeds and phase relationships of the aircraft engines. In many of these known approaches, one engine is selected as a "master" engine and the other as a "slave" engine. When a speed mismatch of sufficient magnitude occurs, the engine speed of the "slave" engine is adjusted to equal that of the master engine.

In the case of multi-spool engines, such as turbofan, turboprop or prop-fan gas turbine engines, only a single spool is typically synchronized. Typically, the speeds of the fan spool (N1) are synchronized. However, the speeds of the high pressure spools (N2) remain non-synchronized, resulting continued generation of undesirable noise and/or vibration. Attempts have been made to synchronize both N1 and N2 speeds in multi-spool engines. Some current approaches rely on closed-loop control of N2 speed based on sensed N2 speed and or one or more other engine parameters. These approaches can exhibit stability issues. Another approach has been to attempt to precision balance the engines prior to installation. This approach can be time-consuming and costly.

Hence, there is a need for reducing engine-induced aircraft cabin resonance that does not rely on closed-loop N2 control and/or does not rely on precision engine balancing. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a method of reducing engine induced aircraft cabin resonance in an aircraft includes sensing a parameter representative of current aircraft flight conditions, and sensing a parameter representative of current engine operating conditions of at least one of a first turbofan gas turbine engines or a second turbofan gas turbine engine. In a control system, the parameter representative of current aircraft flight conditions and the parameter representative of current engine operating conditions are processed to supply a variable inlet guide vane (VIGV) offset value. The VIGV offset value is applied to a VIGV reference command associated with one of the first or second turbofan gas turbine engine, to thereby cause the VIGVs of one of the first or second turbofan gas turbine engine to move to a more closed position.

In another embodiment, an engine induced aircraft cabin resonance reduction system includes a flight condition sensor, an engine operating condition sensor, and a control system. The flight condition sensor is configured to sense a parameter representative of current aircraft flight conditions and supply a flight condition signal indicative thereof. The engine operating condition sensor is configured to sense a parameter representative of current engine operating conditions and supply an engine operating condition signal indicative thereof. The control system is coupled to receive the flight condition signal and the engine operation condition signal and is configured, upon receipt thereof, to determine a variable inlet guide vane (VIGV) offset value, based in part the current aircraft flight conditions and current engine operating conditions, and apply the VIGV offset value to a VIGV reference command associated with one of the first or second turbofan gas turbine engine, to thereby cause the VIGVs of one of the first or second turbofan gas turbine engine to move to a more closed position.

In yet another embodiment, an engine induced aircraft cabin resonance reduction system includes a flight condition sensor, an engine operating condition sensor, and a control system. The flight condition sensor is configured to sense a parameter representative of current aircraft flight conditions and supply a flight condition signal indicative thereof. The engine operating condition sensor is configured to sense a parameter representative of current engine operating conditions and supply an engine operating condition signal indicative thereof. The control system is coupled to receive the flight condition signal and the engine operation condition signal and is configured, upon receipt thereof, to supply a core engine speed difference ($\Delta N2$) sensitivity value based on the current aircraft flight conditions and the current engine operating conditions. The $\Delta N2$ sensitivity value is representative of a change in core engine speed difference relative to a reference core engine speed difference ($\Delta N2_{REF}$) value. The control system is further configured to determine a $\Delta N2$ value based on the $\Delta N2$ sensitivity value and the $\Delta N2_{REF}$ value, and supply a VIGV sensitivity value based on the current aircraft flight conditions and the current engine operating conditions. The VIGV sensitivity value is representative of a change in core engine speed with a change in VIGV position at the current aircraft flight conditions. The control system is additionally configured to determine a variable inlet guide vane (VIGV) offset value based on the $\Delta N2$ value and the VIGV sensitivity value, and apply the VIGV offset value to a VIGV reference command associated with one of the first or second turbofan gas turbine engine, to thereby cause the VIGVs of one of the first or second turbofan gas turbine engine to move to a more closed position.

Furthermore, other desirable features and characteristics of the engine induced aircraft cabin resonance reduction system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
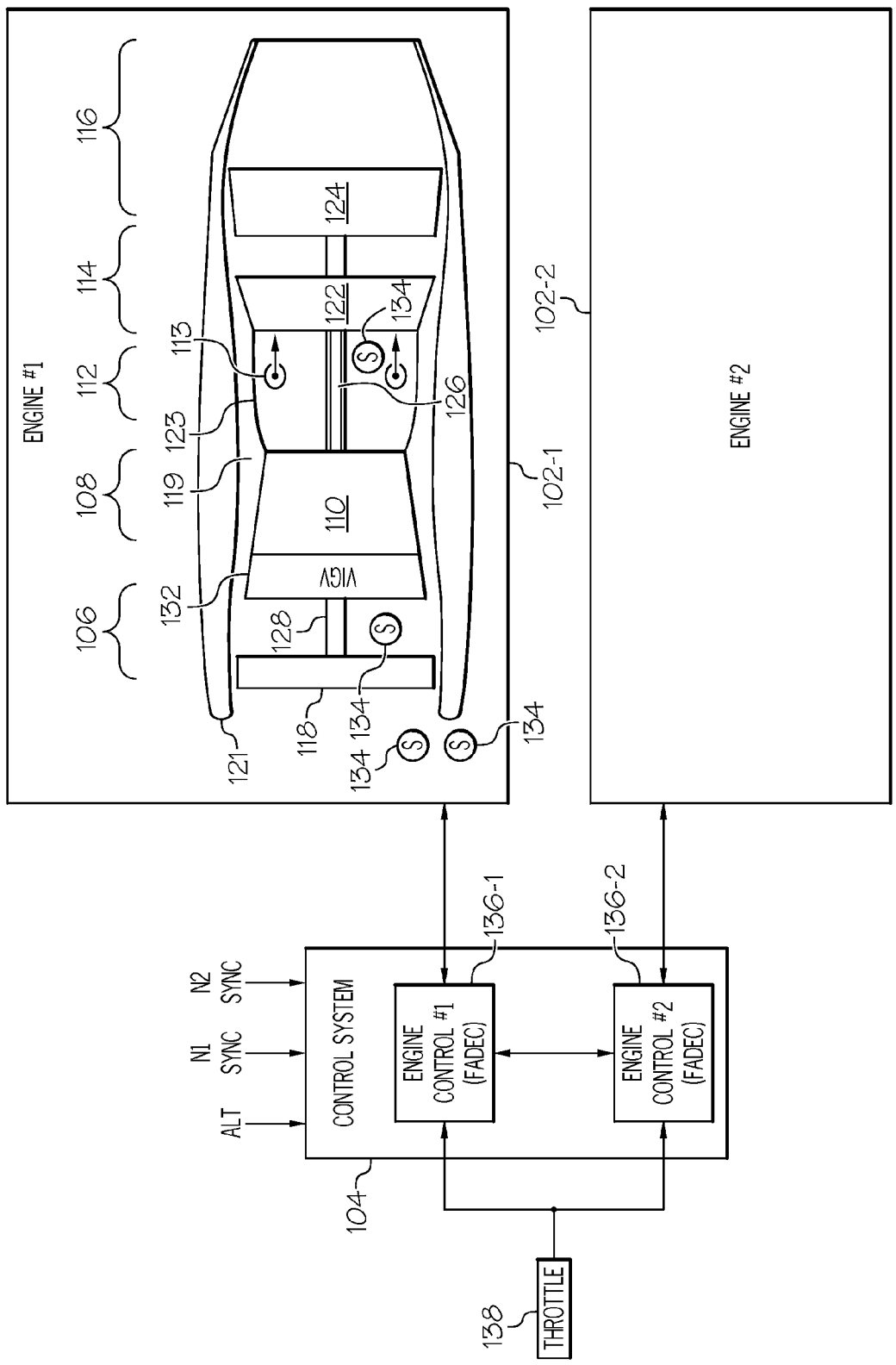
FIG. 1 depicts a functional block diagram of one embodiment of an exemplary engine control system for an aircraft.

Turning now to FIG. 1, a functional block diagram of an exemplary engine control system 100 for an aircraft is depicted and includes a pair of turbofan gas turbine engines 102—a first turbofan gas turbine engine 102-1 and a second turbofan gas turbine engine 102-2—and a control system 104. The turbofan gas turbine engines 102 are both implemented as multi-spool gas turbine engines and, as FIG. 1 further depicts, each includes an intake section 106, a compressor section 108, a combustion section 112, a propulsion turbine 114, and an exhaust section 116. The intake section 106 includes a fan 118, which draws air into the intake section 106 and accelerates it. A fraction of the accelerated air exhausted from the fan 118 is directed through a bypass section 119 disposed between a fan case 121 and an engine cowl 123, and provides a forward thrust. The remaining fraction of air exhausted from the fan 118 is directed into the compressor section 108.

The compressor section 108, which may include one or more compressors, raises the pressure of the air directed into it from the fan 118, and directs the compressed air into the combustion section 112. In the depicted embodiment, only a single compressor 110 is shown, though it will be appreciated that one or more additional compressors could be used. In the combustion section 112, which includes a combustor assembly 113 the compressed air is mixed with fuel supplied from a non-illustrated fuel source. The fuel and air mixture is combusted, and the high energy combusted air mixture is then directed into the propulsion turbine 114.

The propulsion turbine 114 includes one or more turbines. In the depicted embodiment, the propulsion turbine 114 includes two turbines, a high pressure turbine 122, and a low pressure turbine 124. However, it will be appreciated that the propulsion turbine 114 could be implemented with more or less than this number of turbines. No matter the particular number, the combusted air mixture from the combustion section 112 expands through each turbine 122, 124, causing it to rotate. The combusted air mixture is then exhausted through the exhaust section 116 providing additional forward thrust.

As the turbines 122 and 124 rotate, each drives equipment in the engine 102 via concentrically disposed shafts or spools. Specifically, the high pressure turbine 122 drives the compressor 110, via a high pressure spool 126, at a rotational speed that is generally referred to as core engine speed (N2). The low pressure turbine 124 drives the fan 118, via a low pressure spool 128, at a rotational speed that is generally referred to as fan speed (N1).

Each turbofan gas turbine engine 102 also includes variable inlet guide vanes (VIGVs) 132 and a plurality of sensors 134. The VIGVs 132, as is generally known, are disposed in the compressor section 108 of the engine 102 and are used to control the amount of airflow into and through the compressor section 108, and thus into and through the propulsion turbine 114. It is also generally known that the positions of the VIGVs 132 impact the core engine speed (N2). Specifically, moving the VIGVs 132 to a more closed position will cause core engine speed to increase, and vice-versa.

The sensors 134 are used to supply data representative of engine operating conditions and engine flight conditions. It will be appreciated that the number and specific types of data supplied by the sensors 134 may vary. In the depicted embodiment, however, at least a subset of the depicted sensors 134 are configured to supply data representative of, or that can be used to determine, corrected fan speed ($N1/\theta^{0.5}$), core engine speed (N2), current flight conditions, and current engine operating conditions. It will be additionally appreciated that the particular number, type, and location of each of the sensors 134 that are used to supply these data may vary. In the depicted embodiment, however, the sensors 134 that are used include first and second fan speed sensors, first and second core engine speed sensors, first and second total inlet pressure sensors, and first and second total inlet temperature sensors.

The first and second fan speed sensors are configured to sense the fan speed of the first and second turbofan gas turbine engines 102, respectively, and supply first and second fan speed signals indicative thereof, respectively. The first and second core engine speed sensors are configured to sense the core engine speed of the first and second turbofan gas turbine engines 102, respectively, and supply first and second core engine speed signals indicative thereof, respectively. The total inlet pressure sensors are configured to sense the total pressures at the engine inlets and supply signals representative thereof. As is generally known, sensed total inlet pressure is representative of current aircraft altitude and airspeed. The total inlet temperature sensors are configured to sense the inlet temperatures at the engine inlets and supply signals representative thereof. As is generally known, sensed total inlet temperature is used to derive the correction factor ($\theta$), which is used to derive corrected fan speed ($N1/\theta^{0.5}$). It will be appreciated that total inlet pressure and/or total inlet temperature may be sensed at the engine inlets or derived from measurements elsewhere on the aircraft or engines.

The control system 104 is in operable communication with, and is configured to control the operation of the engines 102. In the depicted embodiment, the control system 104 includes a pair of engine controls 136—a first engine control 136-1 and a second engine control 136-2—that are in operable communication with each other. Each engine control 136 is also in operable communication with one of the engines 102 and is configured, in response to a throttle setting 138, to control the flow of fuel to, and thus the power generated by, that engine 102. Moreover, and as will be now described, the engine controls 136 work together to selectively implement a method of reducing engine induced aircraft cabin resonance by implementing an open-loop N2 synchronization control process.

Figure 2:
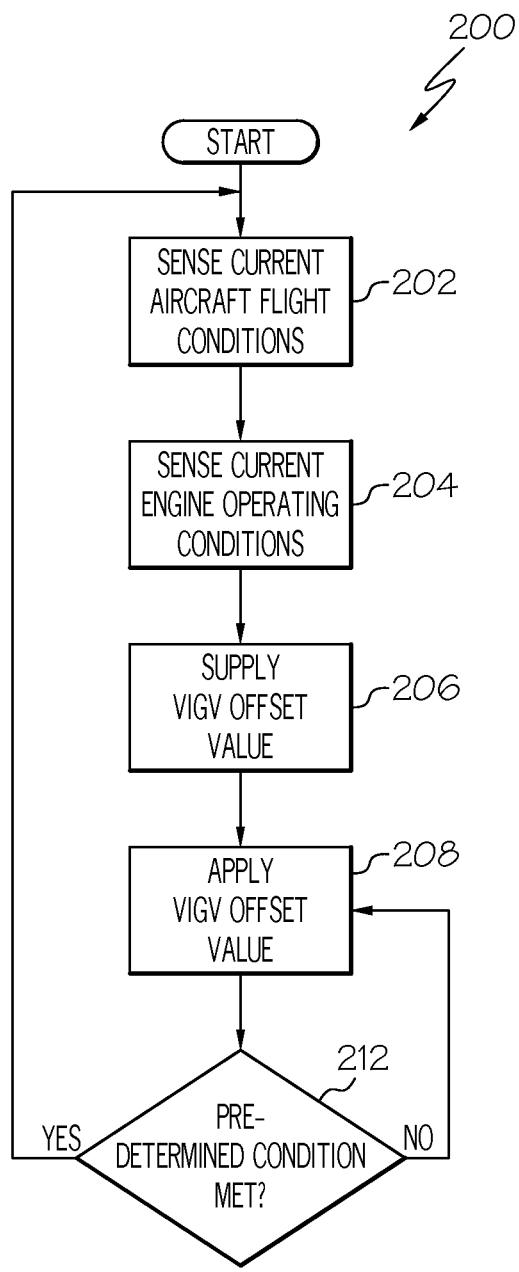
FIG. 2 depicts an embodiment, in flowchart form, of an exemplary open-loop N2 synchronization control process that may be implemented in the system of FIG. 1.

An embodiment of the open-loop N2 synchronization control process that the control system 104 implements is depicted, in flowchart form, in FIG. 2. This process 200, together with a functional block diagram of the logic 300 implemented in the control system 104 to carry out this process 200, will now be described. Before doing so, it is noted that the process 200 may be initiated automatically or, as FIG. 1 depicts, in response to an input (N2 SYNC) to the control system 104. Whether it is initiated manually or automatically, the process 200 is also preferably initiated only after certain conditions are met. These conditions may vary, but in the depicted embodiment include the aircraft being within a predetermined altitude range, the throttle setting being with a predetermined throttle setting range, the engines 102 being in a relatively steady state condition, and meaning not accelerating or decelerating and not supplying bleed air to major bleed loads such as aircraft anti-ice, and the fan speeds (N1) of the engines 102 being synchronized.

Figure 3:
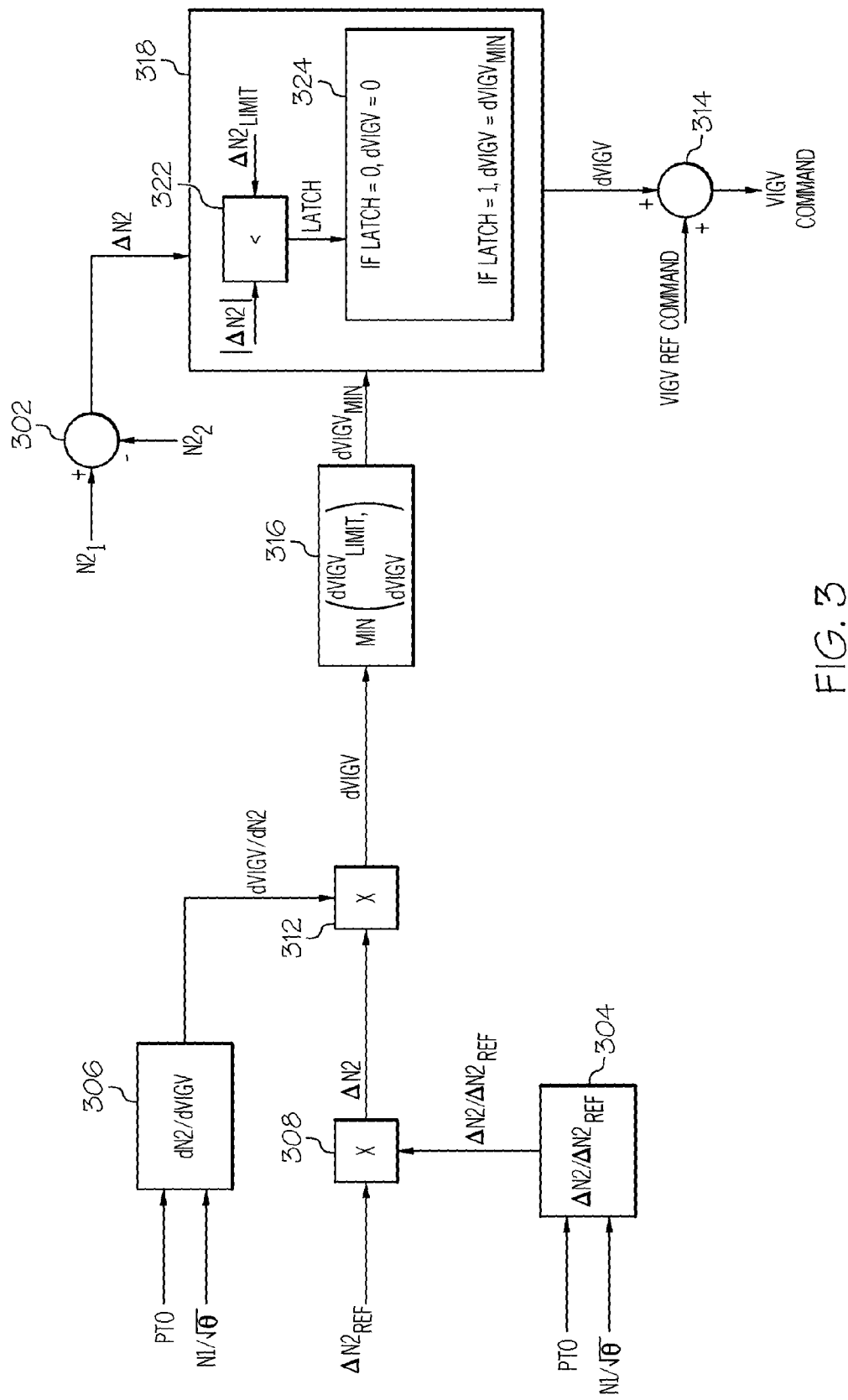
FIG. 3 depicts a functional block diagram of logic that may be implemented in the system of FIG. 1 to carry out the process depicted in FIG. 2.

The process 200, when initiated, begins with sensing the current aircraft flight conditions (202), and the current engine conditions of one of the first and second turbofan gas turbine engines 102 (204). Though not depicted in FIG. 2, it is noted that in a preferred embodiment, the control system 104 first processes core engine speeds of the first ($N2_1$) and second ($N2_2$) turbofan gas turbine engines 102 to determine which has a lower core engine speed. The engine 102 with the lower core engine speed is set as the slave engine, and the engine with the higher core engine speed is set as the master engine. As depicted in FIG. 3, the control system 104 implements a subtraction function 302 to determine the core engine speed difference ($\Delta N2$).

After the current aircraft flight conditions and the current engine conditions are determined, the control system 104 processes the current aircraft flight conditions and the current engine conditions to supply a VIGV offset value (dVIGV) (206). The control system 104 may be variously configured to implement this function, but in the embodiment depicted in FIG. 3, it uses a pair of look-up tables—a first look-up table 304 and a second look-up table 306—and a pair of multiplier functions—a first multiplier function 308 and a second multiplier function 312.

The first look-up table 304 includes a plurality of pre-stored core engine speed difference sensitivity values ($\Delta N2/\Delta N2_{REF}$). Each $\Delta N2$ sensitivity value is representative of a change in core engine speed ($\Delta N2$) relative to a reference core engine speed difference ($\Delta N2_{REF}$) value at various aircraft flight conditions and engine power conditions of interest. The core engine speed difference sensitivity values ($\Delta N2/\Delta N2_{REF}$) are generated using a calibrated engine model, from engine testing, or both. Specifically, at the various aircraft flight conditions and engine power conditions of interest, and with a constant fan air speed (N1), the core engine speed difference ($\Delta N2$) is incrementally measured.

Before proceeding further, it is noted that the $\Delta N2_{REF}$ value is determined based on measurements taken at predetermined, stabilized flight and engine operating conditions. Specifically, at the predetermined, stabilized flight and engine operating conditions, and with engine fan speeds synchronized (N1 synchronization enabled), $\Delta N2$ is measured or calculated. This $\Delta N2$ is established as the $\Delta N2_{REF}$ value. The $\Delta N2_{REF}$ value may be stored in a memory device or it may be implemented via a suitable resistance value. If the latter, the selected resistance value is disposed within, measured by, and converted into an equivalent $\Delta N2_{REF}$ value by the control system 104.

The second look-up table 306 includes a plurality of pre-stored VIGV sensitivity values (dN2/dVIGV). Each VIGV sensitivity value (dN2/dVIGV) is representative of an incremental change in the core engine speed (N2) of the slave engine with an incremental change in the VIGV position at all aircraft flight conditions and engine power conditions of interest. Similar to the core engine speed difference $\Delta N2$ sensitivity values, the VIGV sensitivity values (dN2/dVIGV) are also generated using a calibrated engine model, from engine testing, or both. Specifically, at the various aircraft flight conditions and engine power conditions of interest, and with a constant fan air speed (N1), the normal VIGV command is incrementally varied by an offset value (e.g., dVIGV). The incremental variation in the normal VIGV command will result in an incremental change in core engine speed (e.g., dN2).

It was noted above that the stored core engine speed difference sensitivity values ($\Delta N2/\Delta N2_{REF}$) and the stored VIGV sensitivity values (dN2/dVIGV) are each generated at aircraft flight conditions and engine power conditions of interest. These conditions may vary, but are typically conditions representative of cruise numbers. That is, aircraft altitude and engine speeds associated with cruise conditions. Thus, as FIG. 3 depicts, parameters representative of current aircraft flight conditions and current engine power setting are inputs to the first and second look-up tables 304, 306. Although these specific parameters may vary, in the depicted embodiment these parameters are total inlet pressure (PTO) and corrected fan speed ($N1/\theta^{0.5}$).

Regardless of the specific parameters that are used to select the core engine speed difference sensitivity values ($\Delta N2/\Delta N2_{REF}$) in the first look-up table 304, and the VIGV sensitivity value (dN2/dVIGV) in the second look-up tables 306, the selected core engine speed difference sensitivity value ($\Delta N2/\Delta N2_{REF}$) is supplied to the first multiplier function 308, and the inverse of the selected VIGV sensitivity value (e.g., dVIGV/dN2) is supplied to the second multiplier function 312. The first multiplier function 308, using the speed difference sensitivity value ($\Delta N2/\Delta N2_{REF}$) and the reference core engine speed difference ($\Delta N2_{REF}$) value as operands, generates the core engine speed difference ($\Delta N2$) as follows:

$$\Delta N2 = (\Delta N2_{REF}) \times (\Delta N2/\Delta N2_{REF}).$$

The second multiplier function 312, using the core engine speed difference ($\Delta N2$) and the inverse of the selected VIGV sensitivity value (dVIGV/dN2) as operands, generates the VIGV offset value as follows:

$$dVIGV = (\Delta N2) \times (dVIGV/dN2).$$

Returning momentarily to FIG. 2, it is seen that after the VIGV offset value (dVIGV) is supplied, the control system 104 then applies the VIGV offset value (208). In particular, as FIG. 3 depicts, the VGIV offset value is applied to a VIGV reference command associated with one of the turbofan gas turbine engines 102, and most preferably the previously identified slave engine 102. To do so, the control system 104 implements an addition function 314, which adds the VIGV offset value (dVIGV) to the VIGV reference command associated with the slave turbofan gas turbine engine 102. The control system 104 at least in the depicted embodiment, additionally includes a limiter function 316. The limiter function 316, if included, is configured to limit the VIGV offset value (dVIGV) to a predetermined VIGV maximum offset value ($dVIGV_{LIMIT}$).

Regardless of whether the VIGV offset value is limited, when it is applied it causes the VIGVs 132 of that turbofan gas turbine engine 102 (e.g., the slave engine) to move to a more closed position. As a result, and as was previously mentioned, this will cause the core engine speed (N2) of that turbofan gas turbine engine 102 (e.g., the slave engine) to increase an amount equivalent to, or at least substantially equivalent to, the core engine speed difference ($\Delta N2$). Which means the core engine speed (N2) of that turbofan gas turbine engine 102 (e.g., the slave engine) will match, or at least come sufficiently close to matching, the core engine speed (N2) of the other turbofan gas turbine engine 102 (e.g., the master engine).

Referring once again to FIG. 2, it is seen that, after the VIGV offset value is applied, the control system 104 determines whether or not a predetermined condition is met (212). If the predetermined condition is not met, the same VIGV offset value continues to be applied. If the predetermined condition is met, the process 200 repeats to establish and apply an updated VIGV offset value. It will be appreciated that the predetermined condition may vary. But in the depicted embodiment the predetermined condition is when the absolute value of the core engine speed difference ($\Delta N2$) exceeds a predetermined magnitude.

To implement the above-described function, the control system 104, as depicted in FIG. 3, includes what is referred to herein as latching logic 318. This logic 318 includes a less-than function 322, and an if-then function 324. In particular, the less-than function 322 outputs a logical "1" when the absolute value of the core engine speed difference is less than a predetermined core engine speed difference value ($\Delta N2_{LIMIT}$), otherwise it outputs a logical "0." The if-then function 324 uses the output of the less-than function 322 to set the VIGV offset value (dVIGV). Specifically, if the output of the less-than function 322 is a logical "1," then the VIGV offset value (dVIGV) is set to the output of the limiter function 316. Conversely, if the output of the less-than function 322 is a logical "0," then the VIGV offset value (dVIGV) is set to zero, and an updated VIGV offset value is established.

The system and method described herein provide an open-loop control strategy to drive the N2 of the slave engine toward the N2 of the master engine. The open-loop control strategy provides advantages over closed-loop strategies, which can, at times, exhibit stability issues.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An engine induced aircraft cabin resonance reduction system, comprising:
   a flight condition sensor configured to sense a parameter representative of current aircraft altitude and airspeed and supply a flight condition signal indicative thereof;
   an engine operating condition sensor configured to sense a parameter representative of current engine operating conditions and supply an engine operating condition signal indicative thereof; and
   a control system coupled to receive a signal indicating that fan speed synchronization of the first and second turbofan gas turbine engines has been enabled, the flight condition signal, and the engine operation condition signal and configured, upon receipt of these signals, to:
      determine which turbofan gas turbine engine has a lower core engine speed;
      determine a variable inlet guide vane (VIGV) offset value, based in part the current aircraft flight conditions and current engine operating conditions; and
      apply the VIGV offset value to a VIGV reference command associated with the turbofan gas turbine engine that has the lower core engine speed, to thereby cause the VIGVs of the turbofan gas turbine engine that has the lower core engine speed to move to a more closed position.

2. The system of claim 1, wherein the control system is further configured to:
   supply a core engine speed difference ($\Delta N2$) value based on the parameter representative of current aircraft flight conditions and the parameter representative of current engine operating conditions;
   supply a VIGV sensitivity value based on the current aircraft flight conditions and the current engine operating conditions, the VIGV sensitivity value representative of a change in core engine speed with a change in VIGV position at the current aircraft flight conditions; and
   determine the VIGV offset value based on the $\Delta N2$ value and the VIGV sensitivity value.

3. The system of claim 2, wherein:
   the control system further comprises a look-up table of predetermined VIGV sensitivity values; and
   the control system selects the VIGV sensitivity value from the look-up table, based on the current aircraft flight conditions and the current engine operating conditions.

4. The system of claim 1, wherein the control system is further configured to:
   supply a $\Delta N2$ sensitivity value based on the current aircraft flight conditions and the current engine operating conditions, the $\Delta N2$ sensitivity value representative of a change in core engine speed difference relative to a reference core engine speed difference ($\Delta N2_{REF}$) value; and
   determine the $\Delta N2$ value based on the $\Delta N2$ value and the $\Delta N2_{REF}$ value.

5. The system of claim 4, wherein:
   the control system further comprises a look-up table of predetermined $\Delta N2$ sensitivity values; and
   the control system selects the $\Delta N2$ sensitivity value from the look-up table, based on the current aircraft flight conditions and the current engine operating conditions.

6. The system of claim 1, further comprising:
   a first speed sensor configured to sense core engine speed of a first turbofan gas turbine engine and supply a first core engine speed signal indicative thereof;
   a second speed sensor configured to sense core engine speed of a second turbofan gas turbine engine and supply a second core engine speed signal indicative thereof;
   wherein the control system is further coupled to receive the first and second core engine speed signals and is further configured, upon receipt of these signals, to:
      determine a sensed core engine speed difference ($\Delta N2_{SENSE}$) between the first and second turbofan gas turbine engines;
      compare $\Delta N2_{SENSE}$ to a predetermined magnitude; and
      when $\Delta N2_{SENSE}$ has exceeded the predetermined magnitude:
         determine an updated variable inlet guide vane (VIGV) offset value based on the current aircraft flight conditions and the current engine operating conditions to, and
         apply the updated VIGV offset value to the VIGV reference command.

7. The system of claim 1, wherein the control system is further configured to limit the VIGV offset value to a predetermined VIGV maximum offset value.

8. The system of claim 1, wherein:
   the parameter representative of current aircraft flight conditions comprises total inlet pressure and corrected fan speed; and
   the parameter representative of current engine conditions comprises corrected fan speed.

9. An engine induced aircraft cabin resonance reduction system, comprising:
   a flight condition sensor configured to sense a parameter representative of current aircraft altitude and airspeed and supply a flight condition signal indicative thereof;
   an engine operating condition sensor configured to sense a parameter representative of current engine operating conditions and supply an engine operating condition signal indicative thereof; and
   a control system coupled to receive a signal indicating that fan speed synchronization of the first and second turbofan gas turbine engines has been enabled, the flight condition signal, and the engine operation condition signal and configured, upon receipt of these signals, to:
      determine which turbofan gas turbine engine has a lower core engine speed,
      supply a core engine speed difference ($\Delta N2$) sensitivity value based on the current aircraft flight conditions and the current engine operating conditions, the $\Delta N2$ sensitivity value representative of a change in core engine speed difference relative to a reference core engine speed difference ($\Delta N2_{REF}$) value,
      determine a $\Delta N2$ value based on the $\Delta N2$ sensitivity value and the $\Delta N2_{REF}$ value,
      supply a VIGV sensitivity value based on the current aircraft flight conditions and the current engine operating conditions, the VIGV sensitivity value representative of a change in core engine speed with a change in VIGV position at the current aircraft flight conditions,
      determine a variable inlet guide vane (VIGV) offset value based on the $\Delta N2$ value and the VIGV sensitivity value, and apply the VIGV offset value to a VIGV reference command associated with the turbofan gas turbine engine that has the lower core engine speed, to thereby cause the VIGVs of the turbofan gas turbine engine that has the lower core engine speed to move to a more closed position.

10. The system of claim 9, wherein:
the control system further comprises a first look-up table of predetermined VIGV sensitivity values and a second look-up table of predetermined $\Delta N2$ sensitivity values;
the control system selects the VIGV sensitivity value from the look-up table, based on the current aircraft flight conditions and the current engine operating conditions; and
the control system selects the $\Delta N2$ sensitivity value from the look-up table, based on the current aircraft flight conditions and the current engine operating conditions.

11. The system of claim 9, further comprising:
a first speed sensor configured to sense core engine speed of a first turbofan gas turbine engine and supply a first core engine speed signal indicative thereof;
a second speed sensor configured to sense core engine speed of a second turbofan gas turbine engine and supply a second core engine speed signal indicative thereof;
wherein the control system is further coupled to receive the first and second core engine speed signals and is further configured, upon receipt of these signals, to:
determine a sensed core engine speed difference ($\Delta N2_{SENSE}$) between the first and second turbofan gas turbine engines;
compare $\Delta N2_{SENSE}$ to a predetermined magnitude; and
when $\Delta N2_{SENSE}$ has exceeded the predetermined magnitude:
determine an updated variable inlet guide vane (VIGV) offset value based on the current aircraft flight conditions and the current engine operating conditions, and
apply the updated VIGV offset value to the VIGV reference command.

\* \* \* \* \*